US007437971B2

(12) United States Patent
Gunton

(10) Patent No.: US 7,437,971 B2
(45) Date of Patent: Oct. 21, 2008

(54) DRIVE ARRANGEMENT

(76) Inventor: Bruce Stanley Gunton, 3 Gisborne Close, Yoxall, Staffordshire DE13 8NU (GB)

( * ) Notice: Subject to any disclaimer, the term of this patent is extended or adjusted under 35 U.S.C. 154(b) by 142 days.

(21) Appl. No.: 10/476,020

(22) PCT Filed: May 7, 2002

(86) PCT No.: PCT/GB02/02095

§ 371 (c)(1),
(2), (4) Date: Oct. 23, 2003

(87) PCT Pub. No.: WO02/090699

PCT Pub. Date: Nov. 14, 2002

(65) Prior Publication Data

US 2004/0144201 A1 Jul. 29, 2004

(30) Foreign Application Priority Data

May 9, 2001 (GB) ................................ 0111252.3

(51) Int. Cl.
*F16K 31/05* (2006.01)

(52) U.S. Cl. ........................................................ 74/625

(58) Field of Classification Search .................. 74/625, 74/840; 160/189
See application file for complete search history.

(56) References Cited

U.S. PATENT DOCUMENTS

| | | | | |
|---|---|---|---|---|
| 1,692,918 | A * | 11/1928 | Bachman ..................... | 474/47 |
| 4,311,225 | A | 1/1982 | Tsubaki et al. | |
| 4,409,779 | A * | 10/1983 | Bent et al. ................... | 56/11.3 |
| 4,560,046 | A | 12/1985 | Lorello et al. | |

FOREIGN PATENT DOCUMENTS

| | | |
|---|---|---|
| EP | 0 981 195 | 2/2000 |

* cited by examiner

*Primary Examiner*—Vicky A Johnson
(74) *Attorney, Agent, or Firm*—Smith-Hill and Bedell

(57) ABSTRACT

A drive arrangement for a shaft, such as a shaft for driving a sectional door, roller shutter or the like, is in the form of a module, carried, in use, by the shaft and including a motor, a driven wheel fixed for rotation with the shaft and drivable, in use, by the motor, and clutch means and operable between the motor and the wheel. The module further includes brace means in the form of a limb attachable to a member which is fixed relative to the axis of the shaft, to brace the module against turning as the shaft is driven.

12 Claims, 5 Drawing Sheets

DRIVE ARRANGEMENT

This is a national stage application filed under 35 USC 371 based on International Application No. PCT/GB2002/002095 filed May 7, 2002, and claims priority under 35 USC 119 of United Kingdom Patent Application No. 0111252.3 filed May 9, 2001.

BACKGROUND OF THE INVENTION

The present invention relates to drive arrangements and in particular, but not exclusively, to drive arrangements for driving shafts of electrically operated doors, shutters and the like.

Many doors, such as up-and-over garage doors, roller shutter doors and the like are provided with motors for driving the doors to open or dose. In previous proposals, the motor may be mounted on a framework or door surround but previous proposals have proved bulky or difficult and time consuming to fit, particularly when fitted to existing door systems in place of other motor arrangements.

SUMMARY OF THE INVENTION

The present invention provides a drive arrangement for a shaft, the arrangement having a module which is carried, in use, by the shaft and includes a motor, a driven wheel fixed, in use, for rotation with the shaft and drivable, in use, by the motor, and clutch means operable between the motor and the wheel, the module further comprising brace means attachable to a member which is fixed relative to the shaft axis, to brace the module against turning as the shaft is driven.

The driven wheel is preferably fitted around the shaft and keyed thereto.

The module may comprise a base assembly, and a bearing assembly by which the driven wheel is mounted on the base assembly, whereby the module is carried by the shaft by means of the driven wheel being fixed for rotation with the shaft.

Preferably the motor drives a drive wheel, and the module has a belt around the drive wheel and the driven wheel. The clutch means preferably serves to movably mount the motor and drive wheel relative to the driven wheel, so that the belt can be releasably engaged with the wheels by means of relative movement between the wheels. The module may have a base assembly carried by the shaft, and a carriage assembly carried by the base assembly and movable relative thereto. The base assembly may have a first member fixed relative to the rotation axis of the driven wheel, the carriage assembly having a second member fixed relative to the rotation axis of the drive wheel, the first and second members being movable relative to one another. The first and second members may be plate members.

The module may include pillar members fixed relative to the first or second member, and slots formed in the second or first member, respectively, to allow relative movement of the first and second members.

The arrangement may further comprise a clutch actuating means by which the clutch may be engaged and disengaged. The actuating means may include a cable. The actuating means may include tension means operable, in use, to apply releasable tension to the cable, to cause the cable to pull the clutch means to the engaged condition. The actuating means may include an over-centre catch mechanism. The actuating means may be mounted at a position which is fixed relative to the axis of the shaft.

The brace means may be a limb carried by the module and extending to a distal end at which the limb may be attached to a fixed member, as aforesaid.

BRIEF DESCRIPTION OF THE DRAWINGS

One embodiment of the invention will now be described in more detail, by way of example only, and with reference to the accompanying drawings, in which.

DETAILED DESCRIPTION

Figure 1:
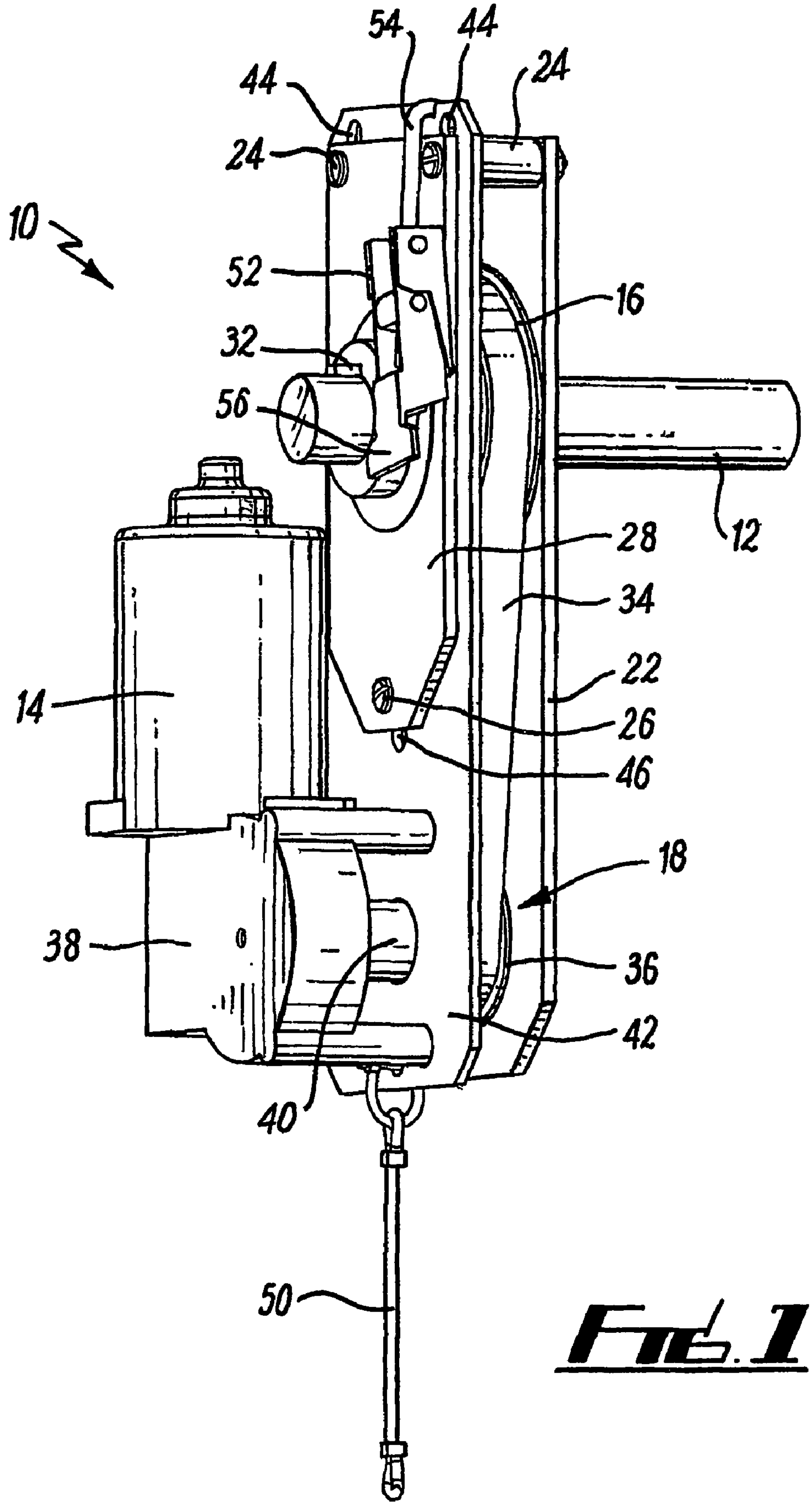
FIG. 1 is a front perspective view of an embodiment of the present invention installed for driving a shaft.
Figure 2:
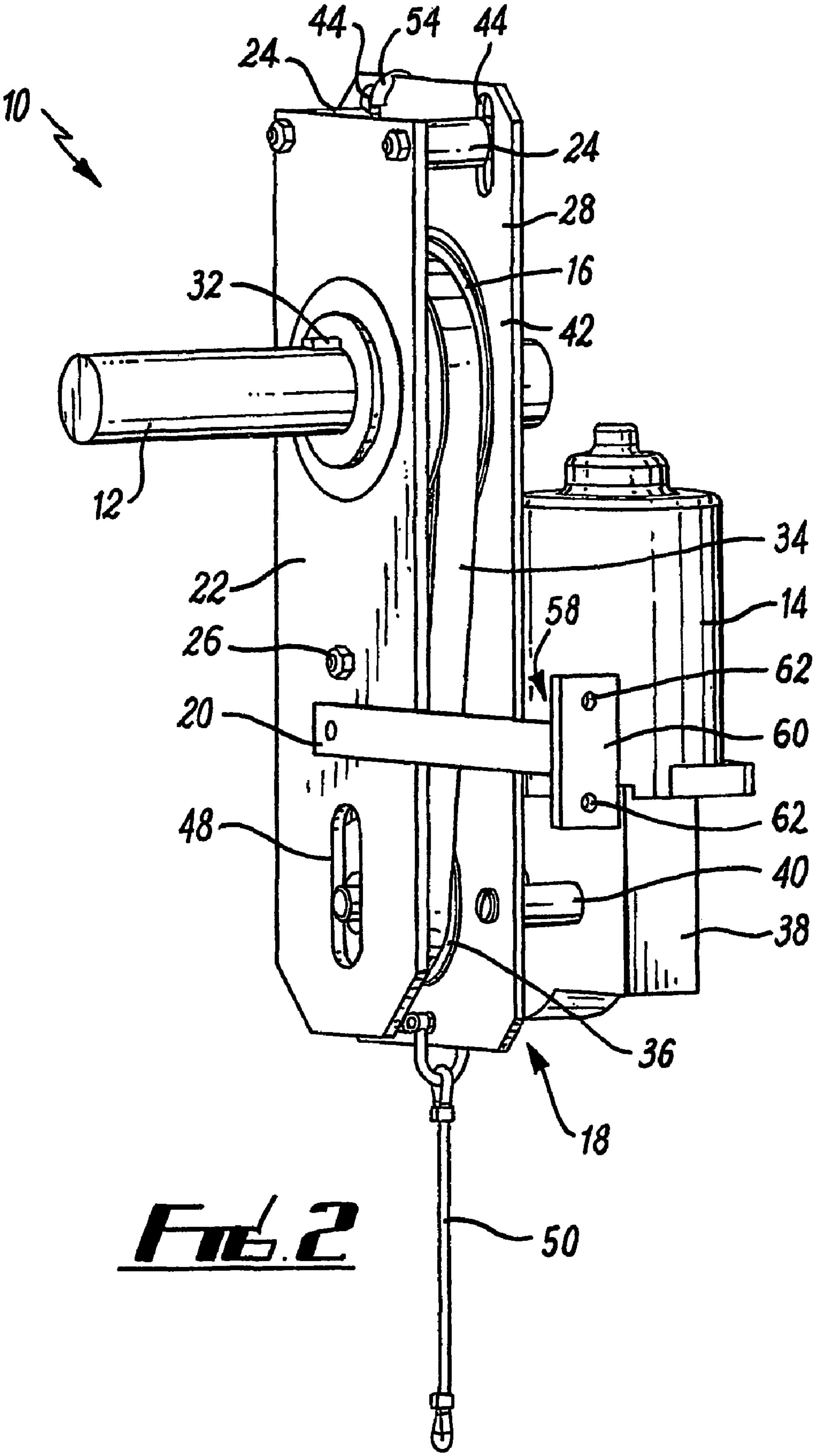
FIG. 2 is a rear perspective view of the arrangement of FIG. 1.
Figure 3:
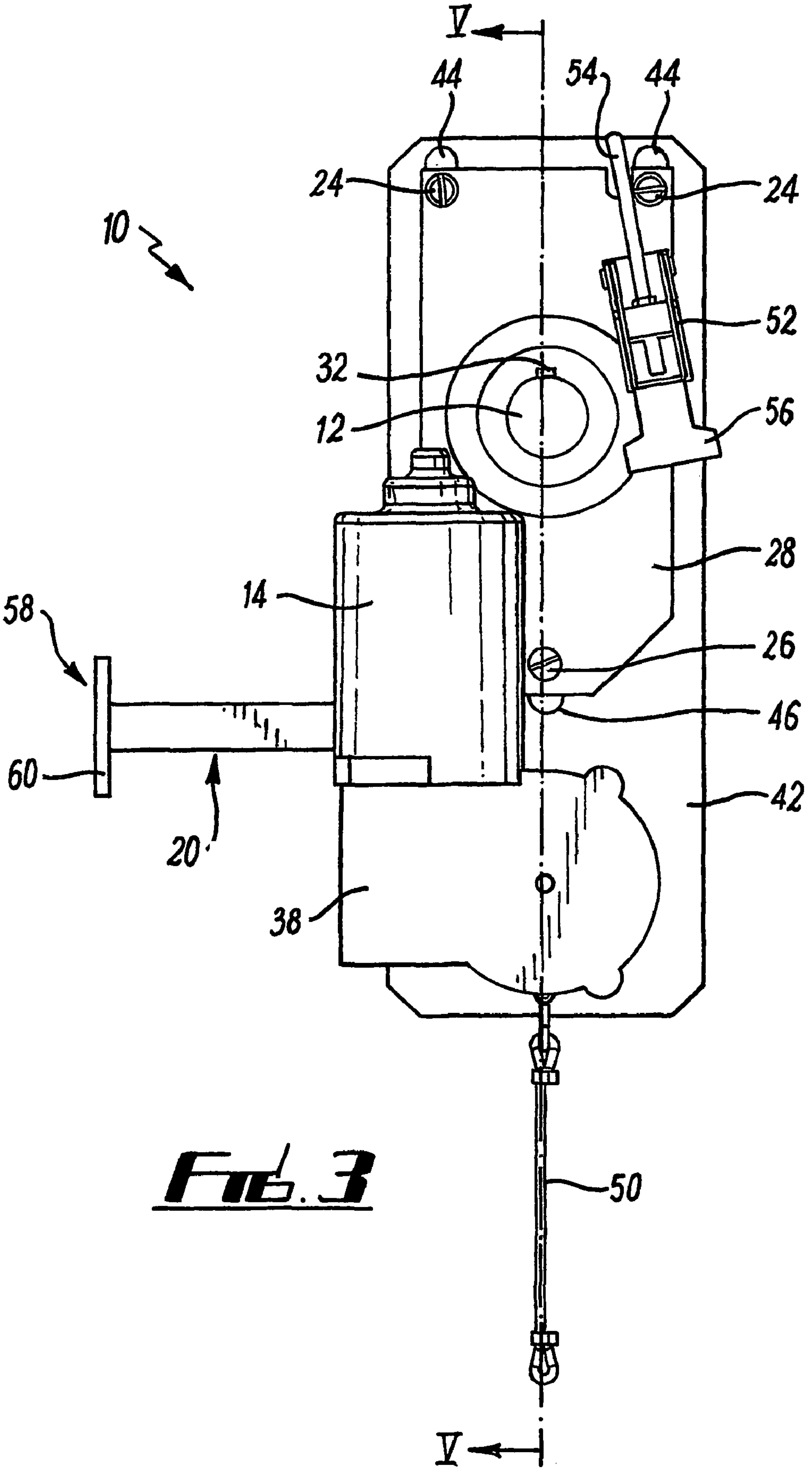
FIG. 3 is a front elevation of the arrangement of FIGS. 1 and 2.
Figure 4:
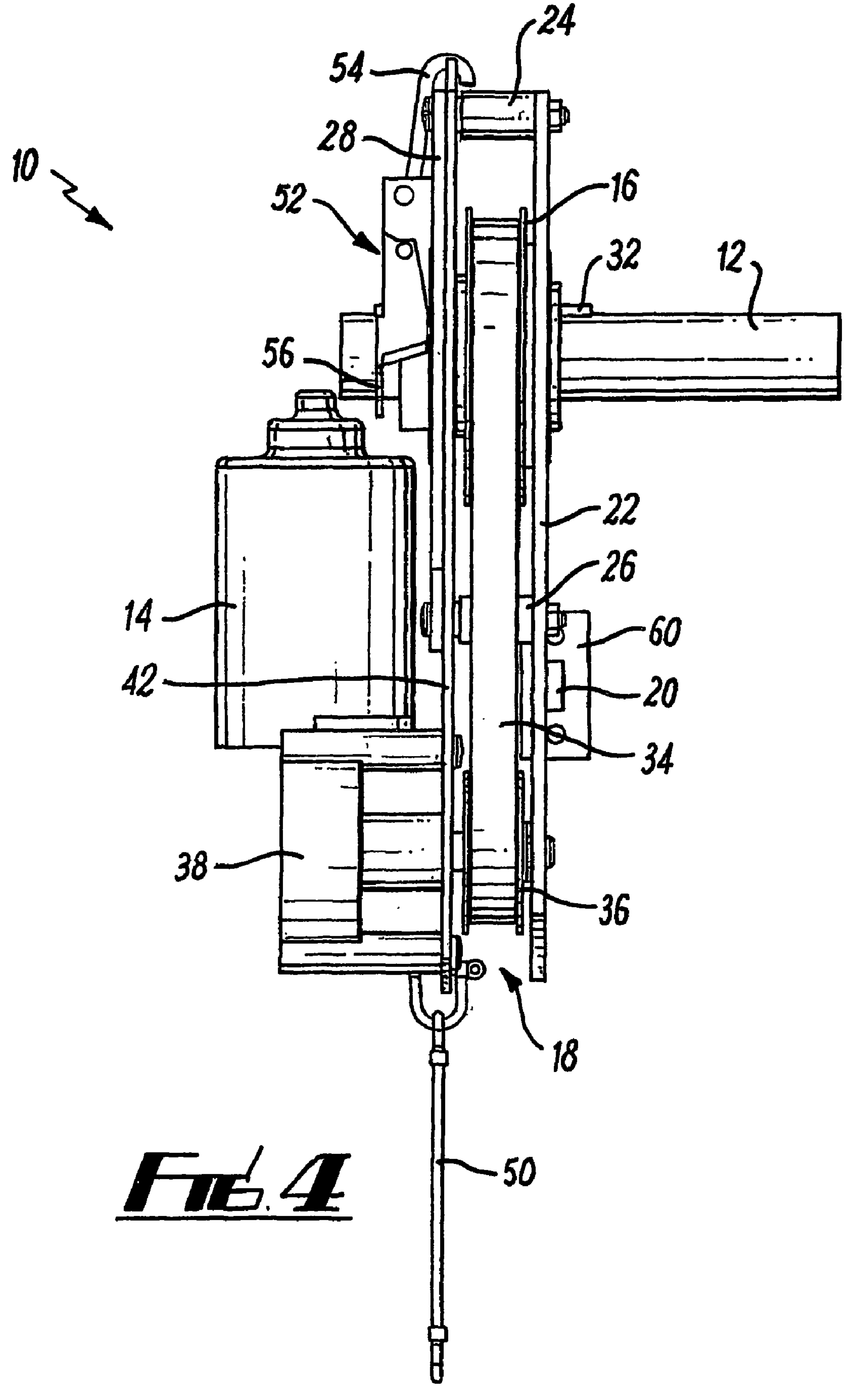
FIG. 4 is an end elevation of the arrangement.

FIG. 1 shows a drive arrangement 10 for a shaft 12, such as a shaft for driving a sectional door, roller shutter or the like. The arrangement 10 is in the form of a module, carried, in use, by the shaft 12 and including a motor 14, a driven wheel 16 fixed for rotation with the shaft 12 and drivable, in use, by the motor 14, and clutch means indicated generally at 18 and operable between the motor 14 and the wheel 16. The module further includes brace means 20 (FIG. 2) in the form of a limb attachable to a member which is fixed relative to the axis of the shaft 12, to brace the module against turning as the shaft 12 is driven.

Figure 5:
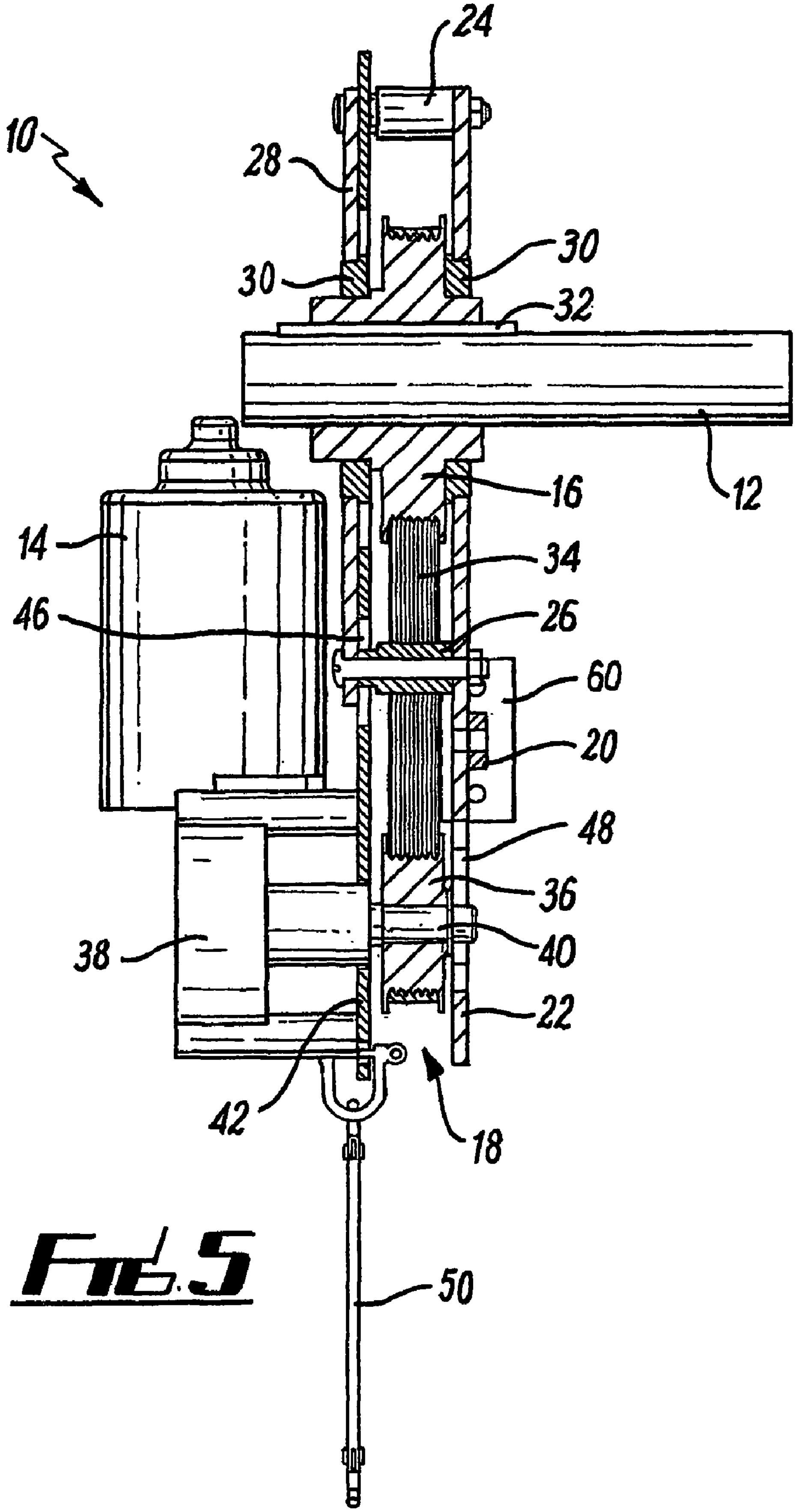
FIG. 5 is a section of the arrangement, along the line V-V of FIG. 3.

In more detail, the module 10 has a back plate 22 attached by means of two upper pillars 24 and a lower pillar 26 to a front plate 28. The driven wheel 16 is located between the plates 22, 28 and mounted to them by bearings 30 (FIG. 5). The wheel 16 is fitted around the shaft 12. The shaft 12 and wheel 16 both have corresponding keyways to allow the introduction of a loose key 32 into both keyways, so that the wheel 16 is fixed for rotation with the shaft 12. Drive to the wheel 16 is provided through a belt 34 from a drive wheel 36. The drive wheel 36 is driven by the motor 14 through a gearbox 38 which has an output shaft 40 on which the wheel 36 is mounted.

Consequently, operation of the motor 14 acts, through the gearbox 38 to turn the shaft 40 and thus the wheel 36. If the belt 34 is engaged with the wheel 36 and also with the wheel 16, this drive is passed to the wheel 16 and thus to the shaft 12, thereby driving the door, shutter etc. However, the engagement of the belt 34 with the wheels 16, 36 is releasable, as can now be described.

In addition to the back and front plates 22, 28, which are fixed in position relative to the rotation axis of the shaft 12, the arrangement 10 further includes a slider plate 42 which carries the gearbox 38. The motor 14 may be mounted directly on the slider plate 42, or on the gearbox 38. However, the motor 14 and gearbox 38, and thus the output shaft 40 and drive wheel 36 are fixed to the slider plate 42.

The slider plate 42 has upper slots 44 to receive the upper pillars 24, and a lower slot 46 to receive the lower pillar 26. The fit of the pillars 24, 26 in the slots 44, 46 allows the plate 42 to slide to a limited extent, relative to the plates 22, 28. A further slot 48 may be provided in the back plate 22 to receive the free end of the output shaft 40. The slider plate 42 thus forms a carriage by which the motor 14 and gearbox 38 move relative to the back plate 22 and front plate 28.

In consequence, the separation of the rotation axis of the wheels 16, 36 can be changed by sliding the plate 42 relative to the plates 22, 28. If the wheel 36 is moved away from the wheel 16, the belt 34 will tend to tighten until the belt 34 is driven by the wheel 36, and conveys the drive to the wheel 16. However, if the wheel 36 is moved towards the wheel 16, or is released to be free to move, engagement between the belt 34 and the wheels 16, 36 will be lost, and drive will not be conveyed as just described. The sliding motion of the plate 42 thus provides the arrangement 10 with a form of clutch between the motor 14 and the wheel 16.

In normal use, it is envisaged that the clutch will remain engaged, with the belt 24 engaging the wheels 16, 36. To this end, a clutch cable 50 is secured at one end to the plate 42 and provided, at its other end, with an arrangement (not shown) for pulling the cable 50 in order to pull the wheel 36 away from the wheel 16 and tighten the belt 34. The pulling arrangement may be an over-centre catch mechanism mounted at a convenient position, such as on the door frame or adjacent wall. It is envisaged that the cable 50 would be continuously pulled in this manner, during normal use, so that the belt 34 and wheels 16, 36 are normally engaged. Rotation of the shaft 12 (including the direction of rotation) can therefore be controlled by appropriate control of the motor 14. However, in the event that motor control is to be overridden (such as in the case of an emergency, fault in the motor or drive, or obstruction of the door being driven), tension on the cable 50 would be released, allowing the plate 42 to move up, releasing the engagement between the belt 34 and the wheels 16, 36.

In addition to the cable 50, the drawings show an alternative override mechanism which includes an over-centre catch 52 mounted on the front plate 28, and a claw 54 reaching above the front plate 28 and over the edge of the slider plate 42. When the catch 52 is engaged as shown in FIG. 1, the claw 54 pulls the plate 42 down, to engage the belt 34 with the wheels 16, 36, as has been described. Alternatively, the catch 52 can be released by pulling the tab 56 away from the plate 28, thus releasing the pull of the claw 54 on the slider plate 42 and disengaging the belt 34, as has been described. It is envisaged that the claw 54 and cable 50 would not both be provided in a single installation, because both would need to be released in order to override the motor 14, but it is convenient to illustrate both alternatives in a single drawing. It is envisaged that tension on the cable 50 may be controlled by an over-centre catch of the type illustrated at 52.

It is envisaged that the belt 34 may be a strongly resilient material such as a synthetic plastic or rubber material, preferably having a plurality of V-shaped ribs along its length, and fitting into corresponding V-shaped circumferential grooves in the wheels 16, 36, as can be seen in FIG. 5. Alternatively, a toothed belt could be used. A chain could be used with toothed wheels, but it is envisaged that more elaborate arrangements would then be required to ensure that the drive is fully disengaged by the operation of the clutch. Further alternative arrangements could be envisaged.

A fixing screw or other arrangement is preferably provided to prevent movement of the arrangement 10 axially along the shaft 12.

It will be understood from the above description and the accompanying drawings that when the motor 14 is in use, the arrangement 10 will seek to apply torque to the shaft 12 in order to move the door, shutter arrangement etc. The reaction to this torque will tend to turn the arrangement 10 about the axis of the shaft 12. This torque is borne by the limb 20. The limb 20 is a rigid arm fixed at one end to the back plate 22, and extends away to a distal end 58 at which the limb 20 carries a plate 60. The plate 60 has bolt apertures 62 by which the plate 60 can be secured to a convenient member fixed relative to the axis of the shaft 12. The arrangement is then braced against turning as the shaft 12 is driven. The limb 20 is preferably adjustable in length, to assist in readily fixing in this manner, and may be attached to the plate 22 in a manner which readily allows for changes in the angle at which the limb 20 extends away from the back plate 22.

The arrangement described above can readily be installed for driving an existing shaft 12, in the following manner. First, the module, which is self-contained, is offered to the end of the shaft 12 to fit the wheel 16 over the shaft end, and may be secured against further axial movement, as described above. The weight of the module is then supported by the shaft 12. The limb 20 is then secured to an appropriate member, such as a part of the door surround, or a convenient nearby wall. This is the only external fixing required if the catch 52 is being used. If the cable 50 is to be used, an appropriate arrangement must be made at the other end of the cable 50. The arrangement 10 is then in condition for use, as described above.

It will therefore be understood that installation is relatively simple in comparison with many prior proposals, and in particular, can require only a single member (the plate 60) to be bolted to a fixed structure.

It will be apparent from the above description that many variations and modifications can be made to the apparatus described above, without departing from the scope of the present invention. In particular, many different materials and many different shapes, sizes and relative shapes and sizes can be used for the various components. The cable 50 could, alternatively, be a chain or other flexible elongate member able to control the clutch. The term "cable" should therefore be interpreted as extending to cover these alternatives.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A drive arrangement, the arrangement having a module which includes a motor, a driven wheel mounted, in use, for rotation within the module and drivable, in use, by the motor, and clutch means operable between the motor and the wheel, and wherein the motor drives a drive wheel, and the module has a belt around the drive wheel and the driven wheel, and the clutch means serves to movably mount the motor and the drive wheel relative to the driven wheel, so that the drive wheel is movable relative to the driven wheel to increase the separation of the rotation axes of the said wheels, and to releasably tighten the belt until the belt tightens to convey drive from the drive wheel to the driven wheel, and wherein the drive wheel is releasable to decrease the separation of the rotation axes of the said wheels and to disengage drive from the drive wheel to the driven wheel, through the belt, the module further comprising brace means, wherein the module is installable as a single unit to a target installation having a shaft to be driven by the arrangement, and is removable as a single unit from the target installation, the module being installable to drivingly engage the shaft of the target installation, and wherein the brace means is attachable, when the module is installed, to a member which is fixed relative to the rotation axis of the driven wheel, to brace the module against turning as the driven wheel is driving the shaft, during use, and wherein the module comprises a base assembly, and a bearing assembly by which the driven wheel is mounted on the base assembly, whereby the module is carried by the shaft by means of the driven wheel being fixed for rotation with the shaft.

2. An arrangement according to claim 1 in which the driven wheel is fitted around the shaft and keyed thereto.

3. An arrangement according to claim 1 in which the base assembly is carried by the shaft, and the module has a carriage assembly carried by the base assembly and movable relative thereto.

4. An arrangement according to claim 3 in which the base assembly has a first member fixed relative to the rotation axis of the driven wheel, the carriage assembly having a second member fixed relative to the rotation axis of the drive wheel, the first and second members being movable relative to one another.

5. An arrangement according to claim 4 in which the first and second members are plate members.

6. An arrangement according to claim 4 in which the module includes pillar members fixed relative to the first or second member, and slots formed in the second or first member, respectively, to allow relative movement of the first and second members.

7. An arrangement according to claim 1 in which the arrangement further comprises a clutch actuating means by which the clutch may be engaged and disengaged.

8. An arrangement according to claim 7 in which the actuating means includes a cable.

9. An arrangement according to claim 8 in which the actuating means includes tension means operable, in use, to apply releasable tension to the cable, to cause the cable to pull the clutch means to the engaged condition.

10. An arrangement according to claim 7 in which the actuating means includes an over-center catch mechanism.

11. An arrangement according to claim 7 in which the actuating means is mounted at a position which is fixed relative to the axis of the shaft.

12. An arrangement according to claim 1 in which the brace means is a limb carried by the module and extending to a distal end at which the limb may be attached to the fixed member, as aforesaid.

* * * * *